United States Patent
Comstock et al.

(10) Patent No.: US 8,638,763 B2
(45) Date of Patent: *Jan. 28, 2014

(54) SYSTEM AND METHOD FOR COMMUNICATING WITH A NETWORK ACCESS NODE

(75) Inventors: Kenneth D. Comstock, Cupertino, CA (US); Yoon K. Wong, Redwood City, CA (US); Jason L. Hertzberg, Northbrook, IL (US); Steven C. Lemke, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 924 days.

This patent is subject to a terminal disclaimer.

(21) Appl. No.: 11/634,348

(22) Filed: Dec. 5, 2006

(65) Prior Publication Data

US 2007/0167149 A1    Jul. 19, 2007

Related U.S. Application Data

(63) Continuation of application No. 09/871,111, filed on May 31, 2001.

(51) Int. Cl.
*H04W 4/00* (2009.01)
(52) U.S. Cl.
USPC .......................................................... 370/338
(58) Field of Classification Search
USPC .............. 455/406, 408, 426, 434, 411, 552.1, 455/572, 456.1, 456.5, 420, 441; 370/352, 370/230, 310, 331, 349, 241; 705/7.19; 715/748

See application file for complete search history.

(56) References Cited

U.S. PATENT DOCUMENTS

| | | |
|---|---|---|
| 4,638,118 A | 1/1987 | Wang et al. |
| 4,650,929 A | 3/1987 | Boerger et al. |
| 4,829,540 A | 5/1989 | Waggener et al. |
| 5,010,547 A | 4/1991 | Johnson et al. |
| 5,012,219 A | 4/1991 | Henry |
| 5,075,684 A | 12/1991 | DeLuca |
| 5,208,745 A | 5/1993 | Quentin et al. |
| 5,276,680 A | 1/1994 | Messenger |
| 5,293,639 A | 3/1994 | Wilson et al. |
| 5,359,317 A | 10/1994 | Gomez et al. |
| 5,374,334 A | 12/1994 | Sommese et al. |
| 5,394,140 A | 2/1995 | Wong et al. |
| 5,430,436 A | 7/1995 | Fennell |
| 5,612,682 A | 3/1997 | DeLuca et al. |
| 5,650,776 A | 7/1997 | Mitchell et al. |
| 5,689,553 A | 11/1997 | Ahuja et al. |

(Continued)

FOREIGN PATENT DOCUMENTS

GB      2313258      11/1997

OTHER PUBLICATIONS

U.S. Appl. No. 11/478,435, filed Jun. 29, 2006, Canova, Jr. et al.
U.S. Appl. No. 11/365,281, filed Feb. 28, 2006, Boyer et al.

(Continued)

*Primary Examiner* — Kiet Doan

(57) ABSTRACT

A system and method for crediting an account of a network access node includes receiving a data signal at a network access node, forwarding the data signal wirelessly to a network user node, and providing account crediting information to an accounting system. The account crediting information represents a credit to be recorded for an account associated with the network access node.

11 Claims, 2 Drawing Sheets

(56) References Cited

U.S. PATENT DOCUMENTS

| | | | |
|---|---|---|---|
| 5,705,995 A | 1/1998 | Laflin et al. | |
| 5,812,945 A | 9/1998 | Hansen et al. | |
| 5,844,600 A | 12/1998 | Kerr | |
| 5,854,975 A | 12/1998 | Fougnies et al. | |
| 5,873,045 A | 2/1999 | Lee et al. | |
| 5,875,186 A | 2/1999 | Belanger et al. | |
| 5,903,852 A | 5/1999 | Schaupp, Jr. et al. | |
| 5,907,604 A | 5/1999 | Hsu | |
| 5,909,239 A | 6/1999 | Lee | |
| 5,925,127 A | 7/1999 | Ahmad | |
| 5,958,006 A | 9/1999 | Eggleston et al. | |
| 5,974,334 A | 10/1999 | Jones, Jr. | |
| 6,029,062 A | 2/2000 | Hanson | |
| 6,067,291 A | 5/2000 | Kamerman et al. | |
| 6,141,531 A | 10/2000 | Williams et al. | |
| 6,141,533 A | 10/2000 | Wilson et al. | |
| 6,157,630 A | 12/2000 | Adler et al. | |
| 6,166,734 A | 12/2000 | Nahi et al. | |
| 6,185,414 B1 | 2/2001 | Brunner et al. | |
| 6,188,917 B1 | 2/2001 | Laureanti | |
| 6,202,060 B1 | 3/2001 | Tran | |
| 6,216,112 B1 | 4/2001 | Fuller et al. | |
| 6,252,544 B1 | 6/2001 | Hoffberg | |
| 6,259,891 B1 | 7/2001 | Allen | |
| 6,285,889 B1 | 9/2001 | Nykanen et al. | |
| 6,300,946 B1 | 10/2001 | Lincke et al. | |
| 6,327,152 B1 | 12/2001 | Saye | |
| 6,332,163 B1 | 12/2001 | Bowman-Amuah | |
| 6,345,279 B1 | 2/2002 | Li et al. | |
| 6,346,963 B1 | 2/2002 | Katsumi | |
| 6,356,905 B1 | 3/2002 | Gershman et al. | |
| 6,377,981 B1 | 4/2002 | Ollikainen et al. | |
| 6,389,457 B2 | 5/2002 | Lazaridis et al. | |
| 6,396,816 B1 | 5/2002 | Astle et al. | |
| 6,401,085 B1 | 6/2002 | Gershman et al. | |
| 6,429,812 B1 | 8/2002 | Hoffberg | |
| 6,438,585 B2 | 8/2002 | Mousseau et al. | |
| 6,438,594 B1 | 8/2002 | Bowman-Amuah | |
| 6,463,464 B1 | 10/2002 | Lazaridis et al. | |
| 6,467,084 B1 | 10/2002 | Howard et al. | |
| 6,470,396 B2 | 10/2002 | Tognazzini | |
| 6,526,034 B1 | 2/2003 | Gorsuch | |
| 6,542,167 B1 | 4/2003 | Darlet et al. | |
| 6,542,854 B2 | 4/2003 | Yang et al. | |
| 6,553,240 B1 | 4/2003 | Dervarics | |
| 6,560,208 B1 | 5/2003 | Takahari | |
| 6,564,051 B2 | 5/2003 | Struhsaker et al. | |
| 6,577,622 B1 | 6/2003 | Schuster et al. | |
| 6,600,421 B2 | 7/2003 | Freeman | |
| 6,601,139 B1 | 7/2003 | Suzuki | |
| 6,625,439 B2 | 9/2003 | Laybourn et al. | |
| 6,654,787 B1 | 11/2003 | Aronson et al. | |
| 6,665,521 B1 | 12/2003 | Gorday et al. | |
| 6,675,012 B2 | 1/2004 | Gray | |
| 6,779,023 B2 | 8/2004 | Tognazzini | |
| 6,813,765 B1 | 11/2004 | Flores | |
| 6,873,692 B1 | 3/2005 | Silver et al. | |
| 6,906,741 B2 | 6/2005 | Canova, Jr. et al. | |
| 6,950,677 B2 | 9/2005 | Lo et al. | |
| 6,950,859 B1 | 9/2005 | Bartek et al. | |
| 6,950,946 B1 | 9/2005 | Droz et al. | |
| 6,952,617 B1 | 10/2005 | Kumar | |
| 6,996,816 B1 | 2/2006 | Bohan | |
| 7,003,040 B2 | 2/2006 | Yi | |
| 7,047,276 B2 | 5/2006 | Liu et al. | |
| 7,058,050 B2 | 6/2006 | Johansson et al. | |
| 7,062,573 B2 | 6/2006 | Tognazzini | |
| 7,076,239 B2 | 7/2006 | Kirkup et al. | |
| 7,092,696 B1 | 8/2006 | Hosain et al. | |
| 7,096,037 B2 | 8/2006 | Canova, Jr. et al. | |
| 7,103,656 B2 | 9/2006 | Lewis et al. | |
| 7,103,760 B1 | 9/2006 | Billington et al. | |
| 7,120,129 B2 | 10/2006 | Ayyagari et al. | |
| 7,159,039 B1 | 1/2007 | Hahn et al. | |
| 7,194,263 B2 | 3/2007 | Bahl et al. | |
| 7,221,387 B2 | 5/2007 | Fernandez et al. | |
| 7,231,208 B2 | 6/2007 | Robertson et al. | |
| 7,444,669 B1 | 10/2008 | Bahl et al. | |
| 7,693,484 B2 * | 4/2010 | Ting et al. | 455/41.2 |
| 7,705,828 B2 | 4/2010 | Griffin et al. | |
| 7,729,493 B2 | 6/2010 | Krieger et al. | |
| 2001/0007821 A1 | 7/2001 | Ricard et al. | |
| 2001/0044321 A1 | 11/2001 | Ausems et al. | |
| 2001/0047300 A1 | 11/2001 | Takashima et al. | |
| 2002/0071416 A1 * | 6/2002 | Carlson et al. | 370/338 |
| 2002/0093531 A1 | 7/2002 | Barile | |
| 2002/0101858 A1 * | 8/2002 | Stuart et al. | 370/352 |
| 2002/0102974 A1 * | 8/2002 | Raith | 455/434 |
| 2002/0111137 A1 | 8/2002 | Walkup | |
| 2002/0138851 A1 | 9/2002 | Lord et al. | |
| 2002/0147008 A1 * | 10/2002 | Kallio | 455/426 |
| 2002/0177431 A1 | 11/2002 | Hamilton et al. | |
| 2002/0178343 A1 | 11/2002 | Tsai et al. | |
| 2002/0183038 A1 | 12/2002 | Comstock et al. | |
| 2003/0142652 A1 | 7/2003 | Ting et al. | |
| 2003/0149724 A1 | 8/2003 | Chang | |
| 2003/0152053 A1 | 8/2003 | Evans et al. | |
| 2003/0182425 A1 | 9/2003 | Kurakake | |
| 2003/0202494 A1 | 10/2003 | Drews et al. | |
| 2004/0097264 A1 | 5/2004 | Bodnar et al. | |
| 2004/0107254 A1 | 6/2004 | Ludwig et al. | |
| 2004/0203380 A1 | 10/2004 | Hamdi et al. | |
| 2004/0204041 A1 | 10/2004 | Fillebrown et al. | |
| 2005/0038701 A1 | 2/2005 | Matthew | |
| 2005/0086338 A1 | 4/2005 | Krishnan | |
| 2005/0226172 A1 | 10/2005 | Richardson et al. | |
| 2007/0060106 A1 | 3/2007 | Haverinen et al. | |
| 2008/0032738 A1 | 2/2008 | Boyer et al. | |

OTHER PUBLICATIONS

U.S. Appl. No. 10/158,338, filed May 30, 2002, Ting et al.
U.S. Appl. No. 10/159,398, filed May 30, 2002, Canova, Jr. et al.
U.S. Appl. No. 09/871,111, filed May 31, 2001, Comstock et al.
D-Link 802.11b Compact Flash Adapter Release, Aug. 1, 2001 [online] [retrieved on Dec. 21, 2001], pp. 1-3. Retrieved from the Internet <http://www.practicallynetworked.com/news/dlink_DCF_650W_PR.ht . . . >.
CSEE Innovative Expo 2000—Projects, "Piconet—A Wireless Ad Hoc Network for Mobile Handheld Devices" [online] [retrieved on Nov. 13, 2001], pp. 1-2. Retrieved from the Internet <http://innovexpo.csee.uq.edu.au/2000/341472962.htm>.
802.11—Planet's Webopedia definition and links: 802.11 [online] [retrieved on Dec. 21, 2001], pp. 1-4. Retrieved from the Internet <http://80211-planet.webopedia.com/TERM/8/802_11.html>.
802.11—Planet's Webopedia definition and links: Infrastructure Mode [online] [retrieved on Dec. 21, 2001], pp. 1-3. Retrieved from the Internet <http//80211-planet.webopedia.com/TERM/infrastructure_mode.ht . . . >.
802.11—Planet's Webopedia definition and links: Ad-Hoc Mode [online] [retrieved on Dec. 21, 2001], pp. 1-3. Retrieved from the Internet <http//80211-planet.webopedia.com/TERM/a/ad_hoc_mode.html>.
Lough, Daniel L., et al., IEEE 802.11 A Short Tutorial on Wireless LANs and IEEE 802.11 [online] [retrieved on Dec. 21, 2002], pp. 1-6. Retrieved from the Internet <http://www.computer.org/students/looking/summer97/ieee.802.htm>.
Outpost.com: Product Detail regarding DWL-500 802.11B Wireless LAN PCI Card 11 Mbps [online] [retrieved on Dec. 21, 2001] , pp. 1-3. Retrieved from the Internet <http://www.outpost.com/product/2975145>.
D-Link Technical Support—Main Page, D-Link Air DWL-650 IEEE 802.11b PCMCIA Wireless Adapte Frequently Asked Questions (FAQ) [online] [retrieved on Dec. 12, 2001] pp. 1-5. Retrieved from the Internet <http://www.dlink.com/tech/faq/wireless/dwl650/>.
Ad-Hoc Communication Between HP Jornadas [online] [retrieved on Oct. 18, 2001] pp. 1-2. Retrieved from the Internet <http://cairo.cs.uiuc.edu/HPJournada/adhoc.html>.
Dell.com: Product Details: D-Link Systems-D-Link DWL-650 Wireless LAN PCMCIA Card 802.11b 11 Mbps [online] [retrieved on

(56) References Cited

OTHER PUBLICATIONS

Dec. 21, 2002], pp. 1-2. Retrieved from the Internet <http://accessories.us.dell.com/sna/productdetail.asp?TabPage=Prod . . . >.
D-Link 11-Megabit IEEE 802.11b Wireless Networking Debuts at Comdex, Press Release, Nov. 13, 2000 [online] [retrieved on Dec. 21, 2002], pp. 1-3. Retrieved from the Internet <http://presslink.dlink.com/releases/pr111300.htm>.
D-Link Slashes Pricing on Award Winning 11-Megabit IEEE 802.11b Wireless Networking Products, Press Release, Feb. 28, 2001 [online] [retrieved on Dec. 21, 2002], pp. 1-3. Retrieved from the Internet <http://presslink.dlink.com/releases/pr022801.htm>.
Howstuffworks: How Wireless Networking Works: Wireless Networking [online] [retrieved on Dec. 7, 2001], pp. 1-3. Retrieved from the Internet <http://www.howstuffworks.com/wireless-network1.htm>.
Howstuffworks: How Wireless Networking Works: HomeRF and SWAP [online] [retrieved on Dec. 7, 2001], pp. 1-3. Retrieved from the Internet <http://www.howstuffworks.com/wireless-network2.htm>.
Schwartz, Ephraim, "Bluetooth Comes of Age", Wireless World, Opinion [online] [retrieved on Oct. 18, 2001], pp. 1-2. Retrieved from the Internet <http://www.infoworld.com/articles/op/sml/01/06/25/010625opwirele . . . >.
Johansson, Per, et al., Comments on Ericsson Review paper on ad-hoc networking: Ad-hoc IP Networks over Bluetooth [online] [retrieved on Oct. 18, 2001], pp. 1-14. Retrieved from the Internet <http://www.isoc.org/inet2001/CD_proceedings/T59/INET_Bluetooth2>.
The Mobile Triangle [online] [retrieved on Nov. 13, 2001], pp. 1-3. Retrieved from the Internet <http://www.salutation.org/scenario/scenario15.htm>.
DSTC m3 Student Project: Project Description [online] [retrieved on Nov. 13, 2001], pp. 1-2. Retrieved from the Internet <http://www.dstc.edu.au/m3/student.htm>.
DSTC m3 Project Goals: Museum Application [online] [retrieved on Nov. 13, 2001], pp. 1-3. Retrieved from the Internet <http://www.dstc.edu.au/m3/irx.htm>.
News: Pocit Labs Announces BlueTalk, the First Bluetooth-Enabled P2P Network Client, Mar. 7, 2001 [online] [retrieved on Nov. 13, 2001], pp. 1-3. Retrieved from the Internet <http://www.thinkmobile.com/News/00/32/26/>.
Geographic Computing with Salutation: Salutation Pitches Geographic Computing Architecture for Palm-Size and Hand Held Computers: White Paper Details Benefits, Development Opportunities for Consumer Applications, Press Release, Jan. 5, 1999 [online] [retrieved on Nov. 13, 2001], pp. 1-2. Retrieved from the Internet <http://www.saluation.org/pr-geo.htm>.
Vance, Ashlee, "Palm Takes Baby Steps Toward Bluetooth", PCWorld.com, Jun. 7, 2001 [online] [retrieved on Nov. 13, 2001], pp. 1-2. Retrieved from the Internet <http://www.pcworld.com/news/article/0,aid,52043,00.asp>.

Ericsson.com: Technology: WLAN (Two MSc Thesis Projects) [online] [retrieved on Dec. 21, 2001], pp. 1-3. Retrieved from the Internet <http://www.ericsson.com/systech/wlan.shtml>.
Selecting the Wireless LAN Operating Mode Quick Guide, Copyright © Nokia Internet Communications Inc 1999. Date: May 17, 2000, pp. 1-6.
Pascoe, Bob, Geographic Computing: Enabling New Markets for Hand Held and Palm-Size Information Appliances: A Salutation White Paper, Dec. 16, 1998, pp. 1-13.
Aguayo, Daniel, et al., Grid: Building a Robust Ad Hoc Network, Parallel and Distributed Operating Systems Group, M.I.T. Laboratory for Computer Science, pp. 1-2.
Amir, Elan, et al., Receiver-driven Bandwidth Adaptation for Lightweight Sessions, University of California, Berkeley, pp. 415-426.
Hodes, Todd D., et al., Composable Ad hoc Location-based Services for Heterogeneous Mobile Clients, University of California, Berkeley, dated May 5, 1998, pp. 1-16.
Sanneblad, Johan, BluePortal: A Framework for Mobile Ad Hoc Network Applications, Viktoria Institute [online] [printed on Sep. 10, 2002], pp. 1-14. Retrieved from the Internet <http://iris24.ifi.uib.no/proceedings/printed-papers/136-138-Sanneblad-pinted.pdf>.
Raychaudhuri, D. et al., "Mobile Multimedia Applications in the WATMnet Broadband Wireless System: Software Architecture and Media Processing Consideration", *Signals Systems & Computers*, 1998, Conference Record of 32$^{nd}$ Asilomar Conference on Pacific Grove, CA, USA, Nov. 1-4, 1998, Piscataway, NJ, USA, IEEE, US Nov. 1, 1998, pp. 73-77.
Form PCT/ISA/220 (Jul. 1998) for PCT International Application No. PCT/US02/37216 dated Mar. 11, 2003, 6 pages.
U.S. Patent Application for Videoconferencing Bandwidth Management for a Handheld Computer System and Method, U.S. Appl. No. 10/159,398, filed May 30, 2002, Inventors, Francis, J. Canova, Jr., Albert H. Ting, 42 pages.
Daniel L. Lough et al., A Short Tutorial on Wireless LANs and IEEE 802.11, printed at Internet address http://www.computer.org/students/looking/summer97/ieee802.htm on May 7, 2001, 6 pages.
Notice of Allowance for U.S. Appl. No. 10/158,338, mail date Dec. 21, 2009, 8 pages.
Office Action for U.S. Appl. No. 11/478,435, mail date Jul. 23, 2009, 14 pages.
Office Action for U.S. Appl. No. 11/637,621 mail date Sep. 11, 2009, 10 pages.
Office Action for U.S. Appl. No. 11/647,526, mail date Apr. 12, 2010, 8 pages.
Office Action for U.S. Appl. No. 11/478,435, mail date Jul. 20, 2010, 10 pages.
Office Action for U.S. Appl. No. 12/649,162, mail date Aug. 24, 2010, 12 pages.
Office Action for U.S. Appl. No. 11/647,526, mail date Sep. 28, 2010, 10 pages.
Office Action for U.S. Appl. No. 11/478,435, mail date Dec. 29, 2010, 10 pages.

* cited by examiner

SYSTEM AND METHOD FOR COMMUNICATING WITH A NETWORK ACCESS NODE

CROSS-REFERENCE TO RELATED APPLICATIONS

The present application is a continuation of U.S. application Ser. No. 09/871,111, filed May 31, 2001, which is incorporated by reference herein in its entirety.

BACKGROUND OF THE DISCLOSURE

The marketplace for portable computing devices has demanded increasing features, particularly relating to wireless communications. Wireless communication features provide convenience and accessibility to consumers, and improve productivity for businesses.

Currently, many wireless standards are competing in the portable computing device market. One such standard is the so-called "3G", or next generation phone systems advanced by telecommunications carriers throughout the world. These new systems will allow cellular phones to have Internet access at broadband speeds, allowing streaming audio, video, and other data to cellular phones and other portable computing devices. However, the 3G marketplace has been delayed due to problems with the network. Also, the likelihood success of the 3G network has been questioned, due to the costs involved in implementing and using the network.

In any event, other wireless standards will be required which are affordable to end users and provide better accessibility and reliability.

One known system is a wireless communication system using radio frequencies for transmitting and receiving voice and data signals. The system includes an internal network having multiple internal communication paths and an external network communication path for linking the internal network to an external communications network. The internal network contains transceivers that allow for decentralized communication along multiple communication paths within the internal network. If the transceivers are out of range of a central call switching and delivery center, they can communicate via intermediate transceivers that relay the calls to the destination transceivers, eliminating the need for a central call switching and delivery center.

One drawback of this system is that it fails to provide an adequate method of collecting payments for airtime used. The transceivers used with this system only operate with special batteries which contain a code that matches the serial number of the transceiver in which it operates. The batteries are recharged at a special recharge station. Payment for the continued operation of the system is collected at the recharge station or in association with the recharge activity. This method of collecting payments is undesirable since it does not operate on a per-call or per-packet basis. Further, it is inconvenient to the user of the transceiver because a special recharge station must be used. Further still, it fails to provide any credit for intermediate transceivers that may be used for providing network links and/or communications.

Accordingly, what is needed is an improved wireless communication system. Further, what is needed is a wireless communication system and method that provides a credit to a network access node. Further still, what is needed is a wireless communication system and method that provides a debit to a network user node. Further yet, what is needed is a wireless communication system for use with a public telephone.

The teachings herein below extend to those embodiments which fall within the scope of the appended claims, regardless of whether they accomplish one or more of the above-mentioned needs.

SUMMARY

According to an exemplary embodiment, a method of crediting an account of a network access node includes receiving a data signal at the network access node and forwarding the data signal wirelessly to a network user node. The method further includes providing account crediting information to an accounting system. The account crediting information represents a credit to be recorded for an account associated with the network access node.

According to another exemplary embodiment, a portable device is configured as a repeater and includes a means for receiving a data signal wirelessly and a means for forwarding the data signal wirelessly to a network access node. The portable device further includes a means for providing account crediting information to an accounting system. The account crediting information represents a credit to be recorded for an account associated with the portable device.

According to yet another exemplary embodiment, an accounting method for crediting an account associated with a network access node includes receiving a communication event message and crediting an account associated with the network access node. The communication event message includes identification data representing a network access node. The communication event message is received in response to the network access node receiving and forwarding a data signal on behalf of a network user node. The account is credited based on the communication event message.

According to yet another exemplary embodiment, a method of crediting an account associated with an access point includes receiving a data signal at the access point and forwarding the data signal wirelessly to a network user node using a wireless local area network (WLAN) communication standard. The method further includes providing account crediting information to an accounting system. The account crediting information represents a credit to be recorded for an account associated with the access point.

According to yet another exemplary embodiment, an access point includes a receive circuit, a transmit circuit, and an accounting circuit. The receive circuit is configured to receive a data signal. The transmit circuit is configured to transmit the data signal over a wireless local area network (WLAN) to a network user node. The accounting circuit is configured to provide account crediting information. The account crediting information represents a credit to be recorded for an account associated with the access point.

According to yet another exemplary embodiment, a system for crediting an account associated with a network access node includes a network access node, a network user node, and an accounting system. The network access node is configured to provide a communication link with a network. The network user node is configured to provide a wireless communication link with the network access node. The accounting system is configured to credit an account associated with the network access node based on a communication between the network user node and the network.

According to yet another exemplary embodiment, a wireless communication module for a public telephone coupled to a public switched telephone network includes a wireless local area network (WLAN) transceiver circuit configured to provide a wireless communication link between the public switched telephone network and a network user node.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF EXEMPLARY EMBODIMENTS

Figure 1:
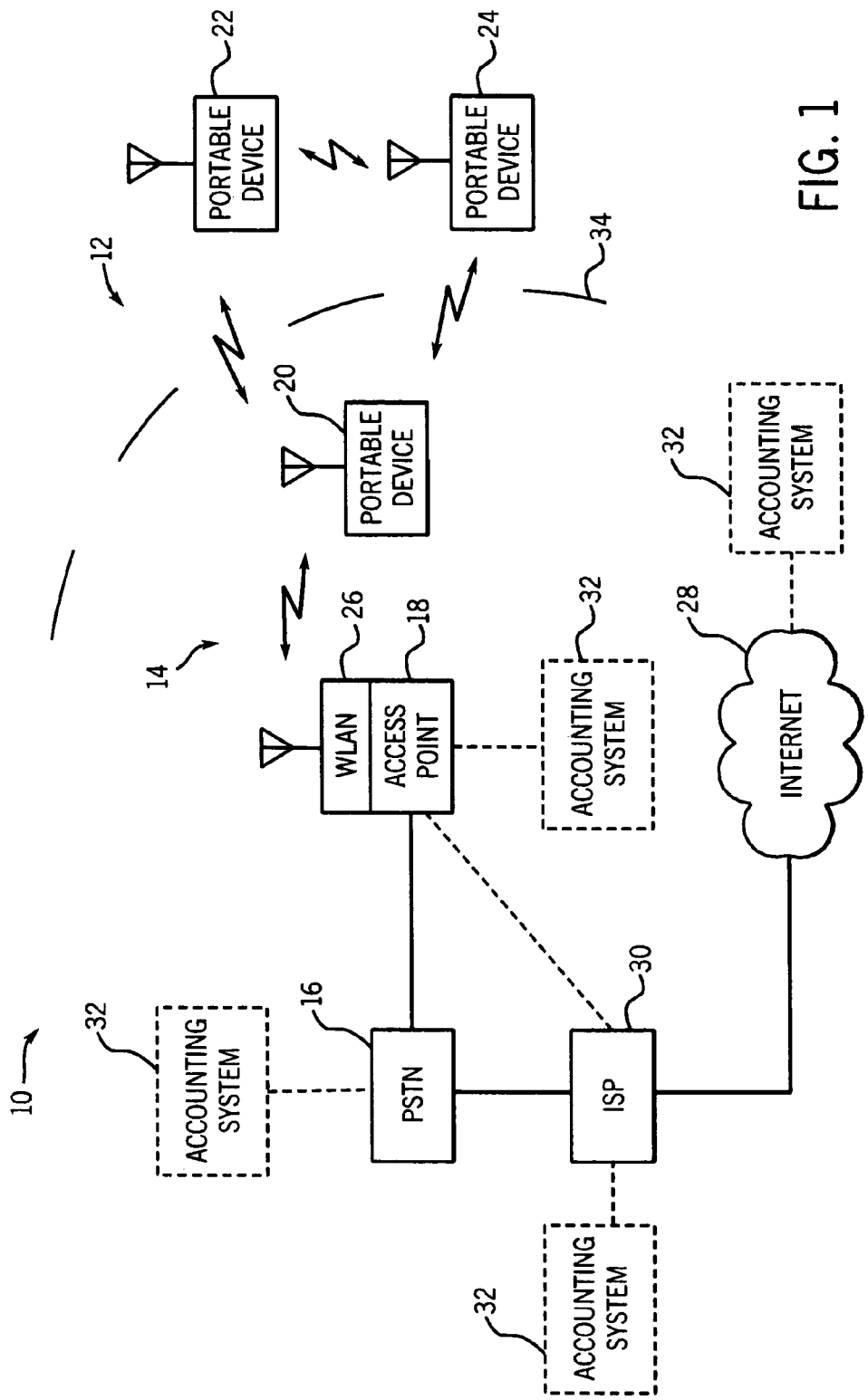
FIG. 1 is a system-level block diagram of a communication system illustrating several exemplary embodiments.

Referring first to FIG. 1, a system-level block diagram of an improved communication network 10 is illustrated, according to several exemplary embodiments. Communication system 10 includes an ad hoc network 12, an infrastructure network 14, and a public switched telephone network (PSTN) 16. Ad hoc network 12 includes two or more nodes which communicate without the use of fixed points. In this exemplary embodiment, ad hoc network 12 is a wireless local area network (WLAN) (e.g., a network communicating via the IEEE 802.11 standard protocol) made up of more than one portable device utilizing a radio frequency (RF) transceiver or infrared (IR) transceivers, such as, but not limited to, portable devices 20, 22, and 24. Infrastructure network 14 is also a WLAN network in this exemplary embodiment, and includes a fixed node with which portable nodes can communicate. The WLANs used in this exemplary embodiment have a typical signal coverage of from 50 feet of coverage area to less than 1,000 feet of coverage area, and may operate in excess of one Megabit per second. WLANs do not include cellular radio systems. The transmission may be radiated light (typically around 800 nanometer (nm) to 900 nm wavelengths) or radio frequency. Other exemplary WLAN protocols include the IEEE 802.5 token ring operation, carrier sense multiple access (CSMA), carrier sense multiple access/collision detection (CSMA/CD), IEEE 802.11A and B, IEEE 802.15, 802.16, Home RF, mesh networks, and personal area networks (PAN), such as, infrared and Bluetooth networks, and other ad hoc and/or unlicensed networks which may be developed in the future. PSTN 16 may alternatively be any type of network, such as, a cable TV network, digital subscriber line (DSL), etc. Various embodiments may utilize one or more of ad hoc network 12, infrastructure network 14, and public switched telephone network 16.

Communication system 10 includes a plurality of nodes which may perform different roles in different embodiments and may perform multiple roles over time. The nodes include portable devices 20, 22, 24 and access point 18. In particular, any of nodes 18, 20, 22 and 24 may act as network access nodes (e.g. repeaters, access points) or network user nodes, as will be described herein below.

Portable devices 20, 22, 24 are computerized devices capable of communicating on one or more of networks 12, 14, 16. Portable devices 20, 22, 24 may include laptop computers, personal digital assistants, connected organizers, pagers, wireless phones, portable digital systems, or other portable devices. Thus, portable devices 20, 22, 24 can be handheld devices and can include a display, input device, (e.g., buttons, keyboard, mouse, voice-activation, etc.), audio output device (e.g., a speaker), etc. Further, portable devices 20, 22, 24 may be representative of personal area networks (PANS) in which devices within the PAN communicate with a portable device capable of accessing network 12, 14, or 16. Each device in the PAN includes a short range wireless transceiver such as Bluetooth or IR transceivers. Portable devices 20, 22, 24 may be configured to act as repeaters or access points. Repeaters receive a data signal wirelessly and forward the data signal to another node, typically wirelessly. Access points receive a data signal via a wired connection to a network, such as public switched telephone network 16, or another network (e.g., wide area network (WAN), intranet, Ethernet, DSL, cable, etc.), and forward the data signal to another node, typically wirelessly. Access point 18 may be coupled directly to an Internal service provider (ISP) 30. Access point 18 may also be a portable device. Thus, each of portable devices 20, 22, 24, and access point 18 includes one or more antennas for transmitting and/or receiving wireless data signals.

Access point 18 includes a wireless communication module 26 in this exemplary embodiment and is illustrated as an add-on structure for a public telephone. Public telephones may include any type of coin-operated phone, pay phone, or other phone accessible to or for the use of the public. Public telephones are located at various indoor and outdoor locations throughout the country and provide advantageous sites for a wireless communication module. Public telephones advantageously include a receive circuit having a connection to PSTN 16, power, billing or accounting structure, and, typically, some degree of security. Wireless communication module 26 is configured to be coupled to access point 18 and includes a WLAN transceiver circuit configured to provide a wireless communication link between PSTN 16 and portable device 20, which is a remote wireless device. Advantageously, wireless communication module 26 further includes a tamper-resistant casing surrounding the WLAN transceiver circuit which may include metal, plastic, or other materials which provide additional security to communication module 26 without unduly interfering with the wireless communication link. According to a further advantageous feature, access point 18 or wireless communication module 26 may include a high-speed connection to PSTN 16, such as, a digital subscriber line (DSL), a T1 line, etc., to improve the speed of communication between PSTN 16 and module 26. Alternatively, a communication link having a higher or lower bandwidth (e.g., a 56 kilobits per second modem, a T1 line, etc.) may be utilized.

Access point 18, acting as a network access mode providing access to PSTN 16 and/or Internet (or intranet) 28, is configured to provide data signals to portable device 20 based on data received from PSTN 16. Such data may include data from Internet 28 which is received via a data source, such as, Internet service provider (ISP) 30. In this manner, portable device 20, as a network user node, communicates with Internet 28 to send and receive data, including textual data, electronic mail, voice data, video data, and other types of data.

In an exemplary embodiment wherein access point 18 is coupled to a public telephone, many advantages are attendant. For example, because public telephones are ubiquitous in public and private areas of the United States, wide-ranging accessibility to a WLAN network is provided for network user nodes, such as, portable devices. Also, network user nodes may access content from Internet 28 or other internet protocol networks via a data source, such as, Internet service provider 30 via PSTN 16.

According to a further advantageous aspect, module 26 may be configured for handing off portable device 20 from one access point to another neighboring access point as portable device 20 travels from a range associated with access point 18 to a range associated with another nearby access point.

According to a further advantage, an accounting system 32 is provided which monitors use of access point 18 by portable device 20 and charges an account associated with portable device 20 or the user thereof, in exchange for the service provided. Thus, the user of portable device 20 may enjoy a wide coverage area accessible via WLAN protocols, and charges for use thereof (for example, on a flat-fee basis, per-usage basis, airtime basis, per-packet basis, or based on the time of day) would appear on a periodic phone bill, such as a monthly phone bill, for the use of portable device 20.

Where accounting system 32 is coupled to PSTN 16, the charges for use of access point 18 appears on a monthly telephone bill (e.g., from a local home telephone service provider) associated with the user of portable device 20. Alternatively, the charges could appear on a separate bill tied to the usage of portable device 20, ISP 30, or another billing system. Furthermore, where high-speed access is available, higher charges may be applied to such a bill when high-speed access is used compared with situations in which the access speed is slower.

As mentioned, accounting system 32 is configured to debit an account associated with portable device 20, which is a destination node of a data signal. Accounting system 32 may include software and/or hardware circuitry configured to monitor usage of access point 18 on a per-packet basis, on an airtime basis, a flat fee basis, or other debiting methods. Various parties involved in the transmission of the data signal to portable device 20 may be involved in the accounting process. As shown in FIG. 1, accounting system 32 may be resident at access point 18, and/or PSTN 16 and/or ISP 30 and/or Internet 28. Furthermore, various parts of the accounting system may be located in one or more of these locations, or other locations. For example, a company may provide an Internet-based accounting system which communicates through ISP 30 and through PSTN 16 to access point 18 in order to monitor communications between access point 18 and network user nodes and to record debit information relating to the communications. Accounting system 32 then generates billing data and sends the billing data, either via electronic mail, paper mail, or in conjunction with an existing local home telephone bill provided by a telephone company to the user of portable device 20. Alternatively, ISP 30 may provide this accounting function or some portion thereof.

According to another advantageous aspect of this exemplary embodiment, a credit is provided to an account associated with access point 18 in compensation for access point 18 acting as a network access node by providing a communication link between portable device 20 and PSTN 16. For example, access point 18 is provided at a commercial or residential establishment, either inside or outside of the establishment. The owner of the establishment is credited for use by one or more portable devices 20 of access point 18. The credit is calculated based on the data signal transmitted, and may be charged on a per-packet basis, based on usage time, on a flat fee schedule, on the time of day of the usage, or other crediting methods. The flat fee schedule may include a standard credit per call, per month, etc. The credit may be a monetary credit or non-monetary credit (e.g., frequent-flyer miles, etc.). In this way, the owner of the establishment associated with access point 18 is provided with an incentive to establish and maintain an access point and to encourage users of portable devices to communicate with the owner's access point. Other parties may also be entitled to a credit, such as, a phone company, wherein the phone company owns and operates access point 18, Internet service provider 30, wherein ISP 30 provides the data signal from Internet 28 or from another network source to access point 18, or another third party who maintains the accounting system 32. In an exemplary embodiment, for a single packet of data that portable device 20 receives from Internet 28 via access point 18 or transmits thereto, accounting system 32 debits the account of portable device 20 by one unit, and credits the one unit based on any number of crediting methods to accounts associated with access point 18, PSTN 16, ISP 30, and accounting system 32.

Depending upon the payment model, access point 18 may generate its own revenue, which may pay for the hardware and high-speed network connection. If additional credit is available due to a high usage of access point 18 by many portable devices 20, a revenue stream over and above that necessary to pay for the hardware and network connection is available for the owner of access point 18, PSTN 16, ISP 30, or other third parties. Advantageously, no one party need pay the cost of a high-speed network connection, such as DSL, but rather the cost is distributed among a number of users of portable devices 20 and/or the owner of access point 18. The owner of access point 18 may choose the amount of credit that access point 18 receives, thereby providing more or less of an incentive for wireless users of portable devices 20 to use access point 18. Network user nodes (e.g., portable device 20) can include a user interface to allow a user to view costs and the speed of different network access nodes (e.g., access point 18) within WLAN range and to select one of the network access nodes for use.

One exemplary method of utilizing such a system will now be described. An owner of a commercial or residential establishment first decides that a high-speed network connection is desired for such things as Internet access. The owner contacts an access point provider who sells, leases, or gives an access point to the owner to be located on the owner's property. The access point provider may be a telephone company, an Internet service provider, or another party. The owner then promotes the availability of high-speed Internet access and other network access to potential users having portable devices in the nearby area (since access point 18 operates via WLAN technology, the range of access point 18 is limited to the range of the WLAN protocol). Accounting system 32 then monitors usage of access point 18, and provides credits to an account associated with access point 18, and potentially other accounts. The credits may be provided on a per-packet basis, or based on another payment method. Accounting system 32 can also debit an account associated with portable device 20 equal to the total credits provided to access point 18 the other parties receiving credits. For example, ISP 30 may receive a credit sufficient to cover the line charge of the high-speed Internet access. Thus, the cost of the service to the owner of access point 18 may be reduced or eliminated. In the event that a party other than the owner provides power to access point 18, this party may also be provided with a credit in accounting system 32.

This exemplary accounting system provides credits and debits for actual usage to the owner of access point 18, which encourages owners to maintain access points and to advertise the availability of access. According to a further alternative embodiment, one or more of nodes 18 and 20-24 may be configured to query accounting system 32 before operating as an access point or repeater to transmit data signals to determine whether the node requesting access has a sufficient account balance, credit line, or established account.

In some situations, the portable device will not be within range of access point 18. For example, as illustrated in FIG. 1, a maximum range line 34 indicates the maximum range within which access point 18 can communicate via wireless communication module 26 in a reliable manner with portable devices. Maximum range line 34 may be approximately 200 feet, approximately 400 feet, or other ranges, typically less than 1,000 feet in a WLAN environment. Portable device 22 and portable device 24 are illustrated as being outside of maximum range line 34. In this situation, portable device 20 acts as a repeater to provide data signals from access point 18 to portable devices 22, 24. Thus, in this embodiment, portable device 20 is a network access node and portable device 22, 24 are network user nodes. Portable device 20 includes a receive circuit and a transmit circuit for communicating with portable devices 22, 24 and with access point 18. In response to a request from portable device 22, portable device 20 sends a return message indicating portable device 20 is available to act as a repeater and is in range of an access point or another repeater which is in range of an access point, and so forth. Portable device 22 then makes a determination based upon received signals from portable device 20 or other portable devices or access points which portable device or access point to communicate with. As mentioned, portable device 22 may include an operator interface to display charges and network speeds associated with each network access node within range and to receive a user selection of one of the network access nodes for use. In this example, portable device 22 selects portable device 20 to act as a repeater for data transmitted and/or received to/from access point 18.

Portable device 20 and/or portable device 22 further includes the function of providing account crediting information to accounting system 32 and/or providing account debiting information to accounting system 32. A communication event message is provided by one or more of nodes 18, 20, 22, 24 to accounting system 32 based on the communication of data among the nodes. A communication event message is a message including information regarding one or more communication events among the nodes. For example, portable device 22 can provide a communication event message having an identification message to portable device 20, either at the time of initiating communication, at the beginning and end of a communication, during a lengthy communication, or periodically. The identification message identifies portable device 22 uniquely and allows accounting system 32 to identify an account associated with portable device 22 for debiting. Portable device 20 may additionally provide account information in the form of an identification message uniquely representing portable device 20, wherein accounting system 32 receives the identification data for portable device 20 and recognizes this identification as associated with an account which is to receive a credit based on portable device 20 acting as a repeater. As discussed hereinabove, accounting system 32 may further provide a credit to access point 18, PSTN 16, ISP 30, a power supplier for access point 18 and/or other third parties.

The transceiver circuitry resident on portable device 20 and portable device 22 may include any type of WLAN communication circuitry. Portable device 22 may further be configured to operate in ad hoc network 12 in addition to communicating with infrastructure network 14.

Account information, including account debiting information and account crediting information, can be provided in a number of ways among portable devices 20, 22, 24, access point 18, and accounting system 32. In one exemplary embodiment, portable device 22 provides a first part of a communication event message having an identification message uniquely identifying portable device 22 to portable device 20. Portable device 20 provides the first part of the communication event message along with a second part of the communication event message including an identification message uniquely identifying portable device 20 to access point 18. Access point 18 provides a third part of the communication event message representing an identification message uniquely identifying access point 18 along with the identification messages of portable devices 20, 22 to accounting system 32. Accounting system 32 reads the communication event message, determines which identification messages correspond to accounts to be credited and which identification messages correspond to accounts to be debited and is configured to make the necessary debits and credits to the respective accounts. The communication event message can include other accounting information, such as, information regarding the number of packets transmitted, the duration of the transmission, billing information (e.g., whether billing is on a per-packet basis, on a flat-fee basis, is to be provided on a calling card, or other account information, etc.), or other necessary billing information.

Portable device 20 will consume power in acting as a repeater. Accordingly, portable device 20 may include additional batteries, or may include a power cord plugged into a conventional power outlet. Thus, portable device 20 may be a handheld device having a rechargeable battery, the device being left in a "sleep" mode while plugged into a power outlet, and being awakened by a request from portable device 22 for portable device 20 to act as a repeater. Advantageously, portable device 20 may be a laptop computer, which includes a rechargeable battery having greater power than smaller portable devices.

By allowing portable device 20 to receive credits while not being used for other purposes, an incentive is provided to use portable device 20 as a repeater for the benefit of other portable devices, such as portable devices 22, 24. Payment is provided in order to compensate portable device 20 for power drain, for usage time, etc.

Figure 2:
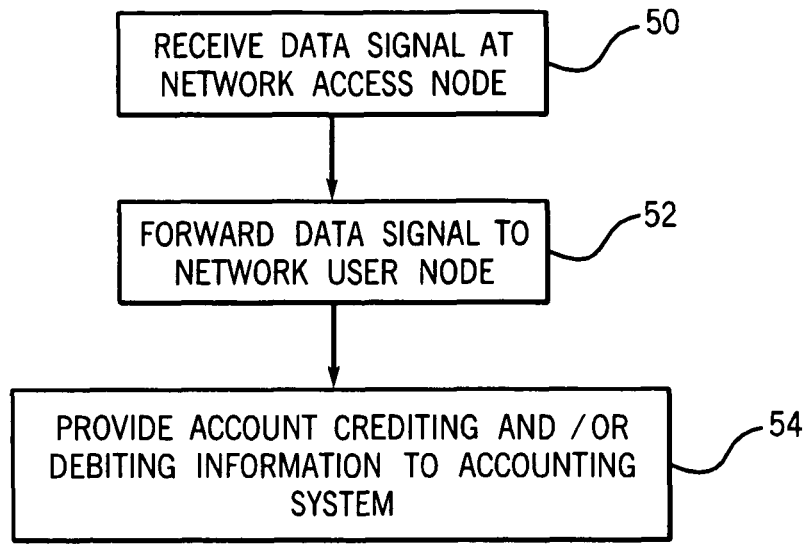
FIG. 2 is a flow chart of a method of crediting and/or debiting an account, according to an exemplary embodiment.

Referring now to FIG. 2, an exemplary method of crediting and/or debiting an account of a network access node will now be described. The method may be operable on a software and/or hardware system resident at one or more locations in communication system 10. For example, the method may be an application program operable on access point 18 or portable device 20 or portable devices 22, 24. At step 50, a data signal is received at the network access node. As mentioned, the network access node may be an access point or a repeater, and may be any of access point 18 or portable devices 20, 22, 24. The data signal may be digital information, voice, video, or other data signals received from a data signal source, such as ISP 30, Internet 28, or other signal sources. A data signal may be received wirelessly via ad hoc network 12 or infrastructure network 14, or may be received via a wired connection, such as, via PSTN 16.

At step 52, the data signal is forwarded wirelessly to a network user node. The network user node can be a portable device, such as, portable device 22, or can be another access point or other device. The data signal may be converted to another communication protocol, or can be communicated in a similar communication protocol to that received. The data signal can be forwarded in a wireless communication protocol, such as a WLAN protocol.

At step 54, account crediting and/or debiting information is provided to accounting system 32. As discussed, account crediting information may include a node identification message, packet information, usage time information, or other information useful to accounting system 32 in providing a credit and/or debit to the nodes of communication system 10. The account crediting and/or debiting information may be provided to accounting system 32 wirelessly, either in a separate message or along with a message containing a data signal, or may be provided periodically via a wired connection (e.g., a synchronization step), or by other steps. The account crediting information may further include a credit to ISP 30 in exchange for providing the data signal, or in exchange for the cost of a high-speed Internet connection (e.g., DSL, T1, etc.), or for other reasons.

After account crediting information has been provided to accounting system 32, accounting system 32 provides credits to network access node accounts associated with portable device 20, access point 18, and other accounts, which may be based on the forwarded data signal (e.g., based on airtime usage, per-packet charges, etc.). Accounting system 32 also provides debits to network user node accounts.

Figure 3:
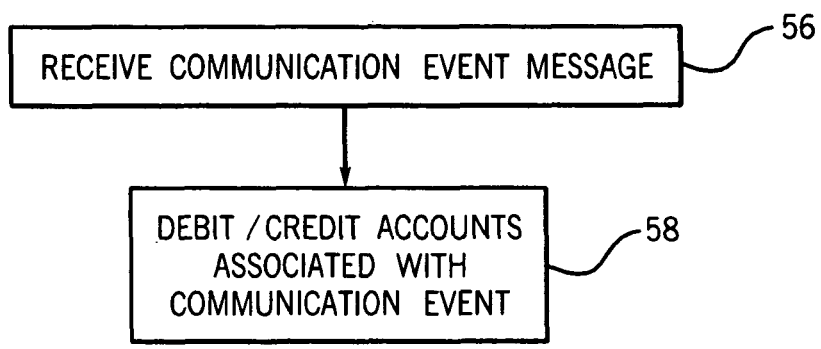
FIG. 3 is a flow chart of an accounting method, according to an exemplary embodiment.

Referring now to FIG. 3, an exemplary accounting method operable in accounting system 32 will now be described. As mentioned, accounting system 32 may be a software program operable on one or more of the nodes in communication system 10.

At step 56, accounting system 32 receives a communication event message. The communication event message preferably includes identification data for each node which requires a credit or a debit. The communication event message is transmitted in response to a network access node receiving and forwarding a data signal on behalf of a network user node in this exemplary embodiment. The communication event message may be sent at the same time as the repeater function or the communication event message may be sent at the end of a period of time, such as a day, week, month, etc.

At step 58, accounting system 32 is configured to credit or debit accounts associated with the communication event message. The communication event message may further include the number of packets in the forwarded data signal, the duration of the communication event between the wireless signal provider node and the destination node, or other data useful to accounting system 32 in providing necessary credits and debits to accounts associated with the communication event.

As mentioned, the exemplary debiting and crediting methods described above may be configured to provide account adjustments (e.g., credits, debits, etc.) to accounts associated with one or more of nodes 18, 20, 22, and 24, or may be configured to provide account adjustments to accounts associated with persons (e.g., users, owners, business associations, etc.). In many cases, both a person and a node will be associated with an account. In other cases, a person may have one account associated with several nodes (or several accounts associated with one node). For example, a person owns several nodes including a portable device, a personal computer, and a vehicle, all of which include transceiver circuitry configured to communicate over one or more of networks 12, 14, and 16. Accounting system 32 can be configured to provide account adjustments to a single account associated with the person based on the use of the person's nodes. Thus, the account associated with the person is credited where any one of the person's nodes is used as a network access node and the account associated with the person is debited where any one of the person's nodes is used as a network user node. The person then may variously use one or more of the person's nodes, wherein all debits are provided to the person's single account.

While the exemplary embodiments illustrated in the FIGS. and described above are presently preferred, it should be understood that these embodiments are offered by way of example only. Accordingly, the present invention is not limited to a particular embodiment, but extends to various modifications that nevertheless fall within the scope of the appended claims.

What is claimed is:

1. A portable computer, comprising:
   a display;
   a transceiver circuit for wireless communication; and
   a computing circuit to communicate, via the transceiver circuit, with (i) a fixed wireless access point having a wired connection to a network, and (ii) a mobile device communicating wirelessly with the network;
   wherein the computing circuit presents on the display a user interface that provides cost information associated with communicating with the network via the fixed wireless access point and via the mobile device, the computing circuit enabling a user of the portable computer to interact with the user interface to select which of the fixed wireless access point or the mobile device to use to communicate with the network;
   wherein the user interface also provides network speed information associated with communicating with the network via the fixed wireless access point and via the mobile device.

2. The portable computer of claim 1, wherein the portable computer comprises a laptop computer.

3. The portable computer of claim 1, wherein the portable computer comprises a wireless phone.

4. The portable computer of claim 1, wherein the transceiver communicates with the mobile device via a wireless local area network.

5. The portable computer of claim 1, wherein the computing circuit communicates with the mobile device via a short range wireless transceiver.

6. A method for communicating between a portable computer and a network, comprising:
   communicating with (i) a fixed wireless access point having a wired connection to the network, and (ii) a mobile device communicating wirelessly with the network;
   presenting, on a display of the portable computer, a user interface that provides cost information associated with communicating with the network via the fixed wireless access point and the mobile device, wherein the user interface also provides network speed information associated with communicating with the network via the fixed wireless access point and the mobile device; and
   enabling a user of the portable computer to interact with the user interface to select which of the fixed wireless access point or the mobile device to use to communicate with the network.

7. The method of claim 6, wherein the portable computer comprises a wireless phone.

8. The method of claim 6, wherein the portable computer comprises a laptop computer.

9. The method of claim 6, wherein communicating with the mobile device includes communicating with the mobile device via a wireless local area network.

10. The method of claim 6, wherein communicating with the mobile device includes communicating with the mobile device via a short range wireless network.

11. The method of claim 10, wherein communicating with the mobile device includes communicating with the mobile device using a Bluetooth protocol.

* * * * *